Feb. 1, 1938.   F. T. HAGUE ET AL   2,106,842
CURRENT COLLECTION APPARATUS
Filed Dec. 17, 1935   3 Sheets-Sheet 1

WITNESSES:
Michael Stark
R. J. Fitzgerald

INVENTORS
Floyd T. Hague &
Frederick R. Davis
BY
O. B. Buchanan
ATTORNEY

Feb. 1, 1938.  F. T. HAGUE ET AL  2,106,842
CURRENT COLLECTION APPARATUS
Filed Dec. 17, 1935   3 Sheets-Sheet 2

WITNESSES:
Fred C. Witham
P. J. Fitzgerald

INVENTORS
Floyd T. Hague &
Frederick R. Davis
BY
O. B. Buchanan
ATTORNEY

Feb. 1, 1938.   F. T. HAGUE ET AL   2,106,842
CURRENT COLLECTION APPARATUS
Filed Dec. 17, 1935      3 Sheets-Sheet 3

↓ Drain

WITNESSES:

INVENTORS
Floyd T. Hague &
Frederick R. Davis
BY
ATTORNEY

Patented Feb. 1, 1938

2,106,842

UNITED STATES PATENT OFFICE 2,106,842

CURRENT-COLLECTION APPARATUS

Floyd T. Hague, Pittsburgh, and Frederick R. Davis, Irwin, Pa., assignors to Westinghouse Electric & Manufacturing Company, East Pittsburgh, Pa., a corporation of Pennsylvania Application December 17, 1935, Serial No. 54,898

30 Claims. (Cl. 171—212)

Our invention relates to current-collection apparatus and it has particular relation to such apparatus which was developed for use in a unipolar generator having an output of 150,000 amperes at 7 volts.

The high current-output of this machine, together with the necessity for a very compact design, has resulted in the utilization of a large number of brushes, packed so closely, around each of the two collector-cylinders of the machine, that about 60% of the surface of each collector is covered by brushes. The result of this arrangement is that the amount of current, to be collected per unit area of each collector-cylinder, is approximately six times as much as has ever been previously collected on any other commercial machine of large amperage, so far as we are aware.

Our attempt to collect so much current from the collector-cylinders has been fraught with many difficulties. Among these difficulties may be mentioned the fact that the friction and abrasive action of the brushes bearing on the collector-surface is so great, because of the large proportion of the total collector-surface covered by the brushes, that it tends to wear off the oxidized surface more quickly than it can be formed by the oxidizing effect of the atmosphere on the collector-surface. This oxidation is needed in order to main a bright, polished surface which contains, or consists largely of, oxides of the collector-ring material.

Our high-current-tensity design of current-collection apparatus has also meant an enormous increase in the production of brush-dust, which, at rates of brush-wear obtainable on previous commercial machines, would mean about six times as much brush-dust as on any other previous commercial machine. The difficulty due to this circumstance will be appreciated when it is recognized that brush-dust clogs the operating mechanisms of the brushes and is a severe hazard to satisfactory brush operation.

The necessity for collecting such a large amount of current from each collector-cylinder has also resulted in a cylindrical collector of very considerable axial extent, (considerably greater than the radius of the cylinder), with a large number of rows of brushes bearing thereon, distributed axially as well as circumferentially. In order to minimize the difficulties in making the current divide substantially equally between the brushes nearest the armature coil and the brushes farthest removed therefrom in an axial direction, it has been necessary to have a collector-ring material of good electrical conductivity, besides having the high hardness which is essential to the maintenance of a polished surface, resulting in a low rate of wear of both the collector-cylinder and the brushes.

In order to overcome the foregoing and other problems, our invention relates to a particular choice of collector-ring material, and to a novel system of air-conditioning and air-jets for blowing a large number of well distributed blasts of conditioned air over the entire uncovered portion of the collector-surface, between brush gangs, for not only supplying the deficiency in oxidation, which is caused by the large percentage of coverage of the collector-surface by our very great concentration of brushes, but also maintaining substantially constant atmospheric conditions, with a humidity most favorable to conserving brush-wear, to make sure that the brush contact-drops are sufficiently equal on all parts of the collector-surface to maintain the necessary equable distribution of current in the brushes. At the same time, our novel air-jet system for the collector-cylinder serves the very necessary function of blowing out the brush-dust as it forms, thus preventing the accumulation of this dust in the brush-boxes and in the spring operating-mechanisms thereof, so that our apparatus operates without the sticking of these elements and the resultant failure of the entire machine.

With the foregoing and other objects in view, our invention consists in the combinations, structures, systems and methods hereinafter described and claimed and illustrated in the accompanying drawings, wherein:

While our invention has certain features of general utility, it was designed particularly to meet the demand for a generator of unusually high current-capacity, suitable for direct-current resistance-welding, at low voltages such as 4 or 6 volts. The conventional commutator-type generator is not as well suited, as the unipolar generator, sometimes known also as the acyclic generator or the homopolar generator, for these welding applications, because such commutator generators become more costly than unipolar generators, at outputs above about 50,000 amperes, and the inductance of the lead-arrangement inherently associated with commutator-type generators, in order to supply a single welding-load requiring about 150,000 amperes, causes a much higher circuit-inductance than when a unipolar machine is used. This is because not much more than 25,000 amperes for each commutator-type generator can be used, involving the parallel operation of several separate machines for the supplying of 150,000 amperes. The inductance of the leads of all of these parallel-operated machines, and the long length of leads involved because of the large amount of apparatus involved, increases the inductance of the lead-layout to a prohibitive value. By prohibitive value we mean that too long a time would elapse between the closing of the weld-circuit and the building up of the weld-stand to the desired constant value. Since the unipolar-type machine can be built of the desired total size, current in a single unit, a very short length of lead-run results, and the leads can be inherently located adjacent to each other, resulting in very low total lead-circuit inductance.

In the design of a large unipolar generator of 150,000-ampere capacity, one of the principal problems to be solved is the collection of the very large current, which is so large that it requires the equivalent of 86 copper cables of 1½ inches diameter to carry it, and the cables or buses must be very securely strapped in place and problems have to be met in regard to the handling of the extremely powerful magnetic field of 150,000 ampere-turns due to the current going out in one lead and returning in another lead.

The fundamentals of current-collection by a sliding contact are still relatively but little understood. No one theory explains all observed conditions. It has been shown that current, in passing over a sliding contact, passes through a few contact-points of small area, the number of such points increasing as the current increases. The voltage-drop across a sliding contact between a copper ring and a metal-graphite brush is made up of about 0.2 volt across a so-called "contact point", plus a voltage-drop across the oxide film, or the shiny contact-surface of the collector ring, made up of, or comprising, entrained air and oxides of the collector-ring material, plus the voltage-drop corresponding to the spreading resistance from the contact points through the bodies of both the brush and the ring. The first and last of these voltage-elements are constant for a given current, but the voltage-drop through the film is dependent on a large number of variables, particularly on the moisture-content of the surrounding air. This film may be of widely varying thickness; the oxides which form it, in whole or in part, may be of high or low resistance; the influence of temperature on it is evident when it is considered that the oxidation of a metallic surface increases as the twelfth power of the absolute temperature; and the voltage-drop across the film is influenced by the size of the brush and by the mechanical stability of the contact, or the contact-pressure between the brush and the collector-ring. We have found it necessary, in order to successfully collect current of any such magnitude as 150,000 amperes, to very carefully control this voltage-drop across the film, in order to secure a reasonably satisfactory division or distribution of current among the large number of brushes which are required to carry the current. Any failure to observe the proper control of this variable film voltage-drop is almost certain to result in a prohibitive overheating and wear of some or all of the brushes.

The development of current-collection apparatus for collecting 150,000 amperes from a unipolar generator has necessitated a large amount of research, in order to insure a uniform distribution of this current through the approximately 1,575 square inches of brush contact surface operating in parallel at each of the two collector-rings. This has involved thorough studies of the following problems:

(1) Selection of the highest favorable collector speed.

(2) Development or selection of improved collector-ring material.

(3) Determination of necessary atmospheric conditions for brush-operation.

(4) Improvements in brushholders to obtain stable contact-pressures or conditions.

The highest favorable collector speed is the highest speed which may be utilized without encountering current-collection difficulties which more than counter-balance the advantages of any higher speeds in the shape of reduced flux-requirements necessary to generate the required voltage in the armature. Oscillographic studies of brush-contact drops, when a controlled high-spot, in an experimental collector-ring surface, is passing under a brush at different speeds, has shown that there is a knee in the curve, representing a critical speed beyond which the collection difficulties increase at a much more rapid rate, with increase in speeds, than formerly. The sharp knee in this curve, where the operating difficulties in commutation increase at a disproportionate rate with any further increase in speed, shows that the low first-cost of high-speed equipment carries with it a heavy penalty in operating difficulties.

The development of an improved collector-ring material, and the investigation of previously available collector-ring materials, has been the object of several years research. Our study and analysis of the problems connected with collector-ring materials has led to our formulation of certain requirements or objectives which we believe to be novel, when more or less taken in their entirety.

Our experience with metal-graphite brushes bearing on collector-rings has indicated that there is a very large difference in operation between a dead-soft ring of 40 Brinell and a ring whose hardness corresponds to hard-drawn pure copper of 75 Brinell, the rate of wear on both the brush and the ring being much smaller with the harder ring. We have found also that there is a noticeable difference between rings of 75 Brinell and rings of 100 Brinell, but that the improvement beyond this last-mentioned point is not marked, with still further increases in the Brinell hardness of the collector-ring material. We have arrived at the conclusion, therefore, as a design-condition for our current-collecting apparatus, that we must have a collector-ring material having a Brinell hardness not less than 75, and preferably at least as high as 100.

By the term "pure copper", we refer to commercial electrolytic copper which is about 99.95% copper.

We have further reached the conclusion that our collector-ring material should have better heat-resistive qualities than pure copper, particularly the ability to retain its hardness at temperatures in excess of 310° C., which is the melting point of hard solder, and temperatures in excess of 210° C., which is the temperature to which the material is subjected to expand it in order to assemble the ring and cause it to have a suitable shrink-fit. The material should also have an elastic limit at least twice that of hard-drawn copper so that it will not lose its shrink-fit pressure when heated 100° C. over its minimum temperature.

Furthermore, we reached the conclusion that the foregoing qualities should be obtained without any great sacrifice of either electrical or thermal conductivity, as compared with that of pure copper. High electrical and thermal conductivity is favorable to current-collection; and in a machine of 150,000-ampere capacity, the requirement of a high electrical conductivity is obviously unusually important, in order to minimize the voltage-drops due to the axial flow of current in the collector-cylinder itself, to say nothing of the resistance-losses which must be absorbed in some manner by the collector-cooling means.

Many copper alloys of very low conductivity will operate with entire satisfaction as the slipring material for commercial machines of relatively low current-output, provided that the slipring material has a high Brinell hardness; and such high-resistance alloys have long been in use. In our large unipolar generator, however, we have ascertained that the requirements of current-distribution among the approximately 700 brushes on each commutator-cylinder, as well as reasonable voltage-drop control along the axial extent of the collector-cylinder, required the use of a collector-ring material having an electrical and thermal conductivity not less than about 70% of that of pure hard-drawn copper, and preferably having an electrical and thermal conductivity of at least 80% or 85% of that of pure hard-drawn copper.

We have also investigated the effects of humidity-conditions on the operation of brushes, and have developed the fact that the actual water-content of the ambient air greatly influences the brush-operation, by controlling the brush contact drop and the coefficient of friction. We found that less than 1.5 grains of water per cubic foot of air will cause a high coefficient of friction, resulting in excessively fast brush-wear, which is highly undesirable, accompanied by a very low contact-drop, which is probably a disadvantage, rather than an advantage, from the standpoint of considering the all-important question of how well the current divides among the approximately 700 brushes in parallel, so that the current is more or less evenly distributed over the entire brush-surface of approximately 1,575 square inches on each collector-cylinder. We found that operation of the machine with 3 or more grains of water per cubic foot of the ambient air on the collector ring insures the most favorable rate of wear of the brushes, by maintaining a low coefficent of friction, and it also involves about double the minimum possible contact-voltage drop which is obtained with about 1.5 grains of water per cubic foot. Operation with humidities at even higher than 3 grains of water per cubic foot is not unfavorable to brush-wear, although the contact-drop is somewhat increased in magnitude. We have found that a fairly high contact-drop is usually more favorable to the securing of a desirable current-distribution than a very low contact-drop. We have laid it down as a principle of operation, therefore, that the collector-cylinder should have an ambient atmosphere of sufficient humidity to insure that there is at least 1.5 grains of water per cubic foot of air, and preferably so that there is at least 3 grains of water in each cubic foot of air.

The stability of brush contact conditions has also required its special study. It has long been a well-established theory that a sliding brush-contact has a certain number of discrete current-carrying points, for a given current, irrespective of the size of the brush. This theory has often been assumed to lead to the corollary that a large number of small brushes should be used. There are a number of additional essential facts, however, which make the last-mentioned deduction incorrect. The principal factor which mitigates against the use of a large number of small brushes is the extreme importance of maintaining the intimacy of contact between the brush and the ring, in order to avoid a chattering, of either a high mechanical frequency imperceptible to the hand, or a low-frequency effect having a long time cycle. We have determined, by test, that the stability of contact between the brush and the ring, as measured by an oscillographic record of the contact-drop, was improved as the physical size of the brush was increased, and that this stability was a measure of the perfection of the current-distribution among parallel brushes. Thus the use of large-size brushes actually reduces the selectivities of preferred current-paths through any particular brush or set of brushes, and produces longer brush-life and longer ring-life, even though there may be a reduction in the total number of contact-points between the brush and the ring. While we do not wish to be limited to any absolute limit of brush-size, we have found it convenient and advantageous to use, on each collector, about 700 brushes, each having approximately 2½ square inches cross-section.

Further improvements in the stability of operation and in the maintenance of a substantially uniform brush-contact, or contact-pressure between the brush and the ring, has involved certain improvements in the brushholders which constitute the subject-matter of our copending application, Ser. No. 54,518, filed December 14, 1935, on the subject of brushholders.

Further absolute essentials of our current-collection apparatus are that the collector-cylinders must be water-cooled on their inner surfaces or bores, or at points radially removed from the peripheral contact-surface, and that these peripheral contact-surfaces must be spirally grooved. The water-cooling provides an absolute control of temperature, which is quite indispensable to the proper division or distribution of current among the brushes, as well as preventing intolerable operating temperatures and avoiding the necessity for an enormously larger number of brushes and an enormously larger area of contacting surfaces, which would be quite incompetitive. The particular improvements in the water-cooling of the collector constitute the subject of our copending application, Ser. No. 54,516, filed December 14, 1935, for Cooling and mounting of collectors for unipolar generators.

The spiral grooving of the collector surface is also quite essential to the maintenance of a proper distribution of the current among the numerous brushes, probably operating (1) to remove large particles which, due to any cause whatsoever, become lodged in the faces of the brushes, and (2) to relieve all areas of the brush contact-surface from carrying current, at least once each revolution of the cylinder. This periodic release of each particle of the brush-faces, from current-carrying duty, prevents concentrated current from developing, and being maintained, at local spots in the brush contact surface, thus overheating and producing abnormal maladies in the brush-performance. The spiral grooving thus serves to produce an even wear of the brushes and collector-cylinder, and to maintain substantially constant contact-drop phenomena under all of the brushes.

Figure 1:
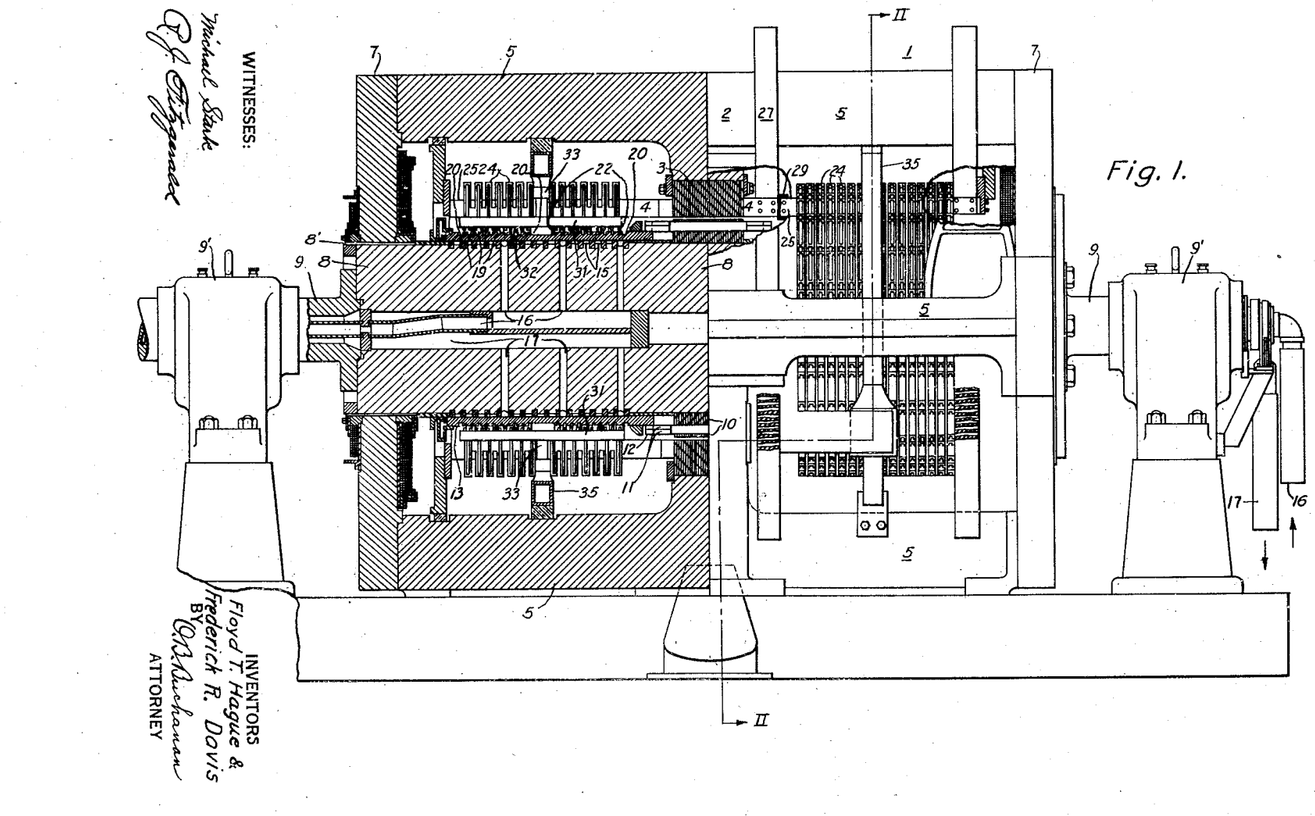
Figure 1 is a side elevational view, partly in section, showing a unipolar generator embodying our invention.

As shown in Fig. 1, our unipolar generator comprises a yoke 1 of low-carbon steel to insure good permeability. The central portion 2 of the yoke is annular in shape, and has secured, in the bore thereof, a laminated stator-core 3 which carries a plurality of conductor bars 4 therein, serving as a compensating winding, as described and claimed in our application, Ser. No. 54,518, filed December 14, 1935, for a Compensated unipolar generator. Secured to the annular central portion 2 of the yoke 1 are a plurality of yoke-arms 5 extending axially on each side of the central portion 2, there being four arms 5 on each side of the central portion 2, in the particular embodiment of our invention shown in Fig. 1. At each end of the yoke, secured to the yoke-arms 5, there is an end bracket 7 which carries the flux and is separated from a rotor-forging 8 by an air-gap 8'. The rotor-forging includes a shaft 9 which is journaled in bearings 9'. At about the center of the rotor-shaft 8, there is a laminated rotor-core 10 carrying armature-conductors 11, the ends of which are soldered, at 12, to the two collector-cylinders 13, respectively, one at either end of the machine. The details of the soldered joints between the armature-conductors 11 and the collector-cylinders 13 constitute the subject-matter of an application of H. Matthews, Ser. No. 54,465, filed December 14, 1935, for Collector-neck connections, assigned to the same assignee as the present application.

Each collector-cylinder 13 is a solid, massive casting, made of a copper-base alloy having the qualities previously set forth as being essential. By "solid", we mean that each collector-cylinder is cast or constructed in a single piece, as a single massive tube of sufficient radial thickness to give the necessary strength and to carry the extremely large currents which it is called upon to carry, without excessive resistance-drops therein. One alloy-material or group of alloy-materials, which we have found extremely satisfactory for our collector-cylinders 13, may be defined as a copper-base alloy containing chromium in an amount from .1 to 1%, or even up to about 2%, preferably, however, in the range from .4 to .7%; and very advantageously also containing silver in an amount from 1 to 100 ounces per ton. This particular alloy, as a composition of matter per se, constitutes the subject-matter of a copending application of Hensel and Larsen, Serial No. 5,528, filed February 8, 1935, patented March 10, 1936, No. 2,033,709, particularly when subjected to the heat-treatment covered in another copending Hensel and Larsen application, Serial No. 714,614, filed March 8, 1934.

In comparison with hard-drawn copper, which is the most satisfactory collector-ring material previously tested, to our knowledge, our above-mentioned copper-alloy material has the following characteristics:

|  | Copper | | Our material | |
| --- | --- | --- | --- | --- |
|  | Cast | Forged | Cast | Forged |
| Electrical conductivity | 70% | 100% | 88% | 90% |
| Strength, pounds/sq. in. | 8,000 | 10,000 | 25,000 | 45,000 |
| Brinell hardness | 40 | 75 | 100-130 | 130-160 |
| Temperature causing annealing | 200° | 200° | 450° | 450° |
| Temperature causing melting |  |  | 1080° |  |
| Thermal conductivity |  | 100% | 85% |  |
| Relative rate of collector wear |  | 100% | 50% |  |
| Relative rate of brush wear |  | 100% | 50% |  |

It is thus apparent that our material far exceeds the specified requirements previously set forth as the minimum acceptable qualities of our collector-ring material.

Referring to Fig. 1, we show our water-cooling means for the collector-cylinders 13, by way of example, as comprising water-cooling channels 15 between each collector-cylinder 13 and the portion of the shaft 8 thereunder, and water inlet and outlet means 16 and 17, at each end of the machine, for leading the cooling-water into and out of the machine.

The peripheral contact-surface of each collector-cylinder 13 is provided with spiral grooves 19, for the purpose previously mentioned, and it is also provided with annular or circumferential grooves 20 which divide the surface of each collector-cylinder 13 into two parts, corresponding, in width, to two axially-spaced groups of brushes 22 bearing on the collector-cylinder. The machine operates without end-play, so that the circumferential grooves 20 create brush-tracks which are approximately identical in width with, or very slightly wider than, the overall brush face, insuring uniform wear of the collector surface.

The brushes 22 are compactly spaced, both axially and circumferentially along and around each collector-cylinder 13, being supported by brushholders 24, which are in turn supported from extensions 25 of the compensating conductor-bars 4. At one end of the machine, where the terminal leads 27 and 28 are connected, the compensating-bar extensions 25 are insulated from the rest of the compensating-bar structure, as indicated by the insulating joints 29. The brushholders and their mounting constitute the subject-matter of our copending application, filed simultaneously herewith, on that subject.

It will be observed that the particular machine illustrated in our drawings has 22 compensating bars 4 distributed uniformly around the circumference of the rotor, and hence that it has 22 rows of brushholders 24 disposed around each collector-cylinder 13. There are four brushholders in each row, each brushholder supporting eight brushes in two rows of four brushes each, making 22 x 32 or 704 brushes in all, for each collector, each brush having a cross-section of approximately 1½ inches by 1½ inches. The arrangement is very compact, so that approximately 60% of the collector-surface is covered by brushes, or, in general, over 50% of the collector-surface is covered by brushes.

As previously pointed out, such a current-collecting apparatus would not operate satisfactorily without some suitable means for oxidizing the uncovered surface of the collector-surfaces and carrying away the dust due to the brush-wear. Since there are approximately 3,200 cubic inches of brush-material given off, at the two ends of the machine, for every inch of brush-wear, it is obvious that continuous operation would be considerably handicapped without automatic provision for dust-removal. The importance of oxidizing the nearly covered collector surface, so as to maintain its bright polish essential to good current-collection, and the importance of supplying conditioned or humidified air in such manner that all portions of the collector-surface are operating under substantially the same conditions, which are preferably the optimum conditions with respect to brush-wear as related to humidity, have previously been explained.

In accordance with our invention, therefore, we utilize a high-pressure air-system, with air-conditioning or humidification, for furnishing a large number of jets of air, blowing on the uncovered portions of the collector-surface, and well distributed, both axially and circumferentially of each collector-cylinder 13. This air-system comprises 22 air-distributor ducts 31 for each collector cylinder, one distributor-duct being disposed underneath each of the compensating-bar extensions 25 which support the brushholders 24. These air-distributor ducts 31 have a large number of nozzles or openings 32 which blow high-velocity jets against the surface of the collector-cylinder.

Figure 2:
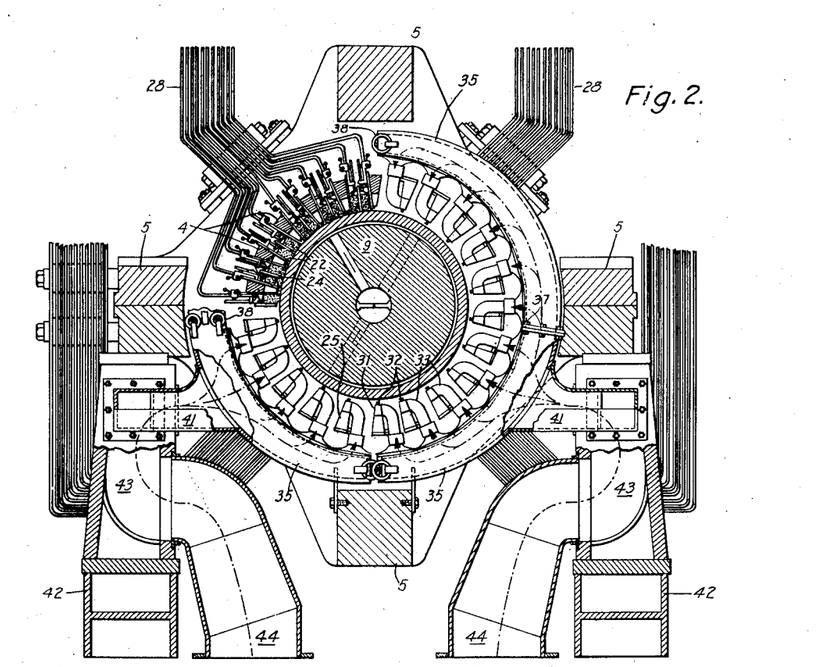
Fig. 2 is a transverse sectional view thereof, approximately on the line II—II of Fig. 1.
Figure 3:
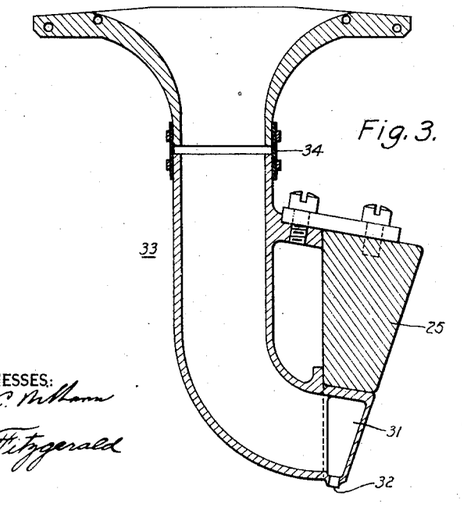
Fig. 3 is a detail sectional view of the feeder-tube assembly.

Air is supplied to the center of each air-distributor duct by means of a feeder-tube assembly 33, as shown in Figs. 2 and 3, the same being detachably mounted for convenient dismantling. Each feeder-tube assembly (Fig. 3) needs a short length of insulating tube 34, of rubber or other suitable insulating material, to avoid grounding the compensating-bar extensions 25.

Air is supplied to the feeder-tube assemblies 33 from two annular or circumferential air-ducts 35, one for each of the collector-cylinders 13. These annular air-ducts are supported in a central position around the respective collector-cylinders 13, being suitably mounted within the yoke-arms 5.

In order to provide for the maintenance and proper care of the current-collecting apparatus, it is necessary to provide for the convenient removal of the circumferential air-ducts 35; and to this end these ducts are made in sections, each extending approximately one-fourth of the way around the machine, the adjacent sections being detachably connected together with detachable fasteners, such as bolts 37 or latches 38.

Each circumferential air-duct 35 is divided vertically into two semi-circular portions, each receiving its separate air-supply from an intake-duct 41, which connects to the central supporting-pedestal 42 on its side of the machine, each of said pedestals being made hollow in order to provide an intake-air passage 43 therein, which does not interfere with accessibility to the brushes. Air is supplied, under high-pressure, to the pedestal-passages 43, by means of ducts 44 mounted in the pit underneath the machine, as indicated in Fig. 2.

Our choice of a high-pressure system for distributing the air for the current-collecting apparatus economizes space, which is at a premium in the compact design of our unipolar generator, as well as affording the advantages hereinbefore pointed out with respect to providing an adequate surface-oxidizing means, a dust-blower, and a uniform supply of humidified air, besides assisting in the cooling of the brushes and the brushholder parts.

Figures 4, 5:
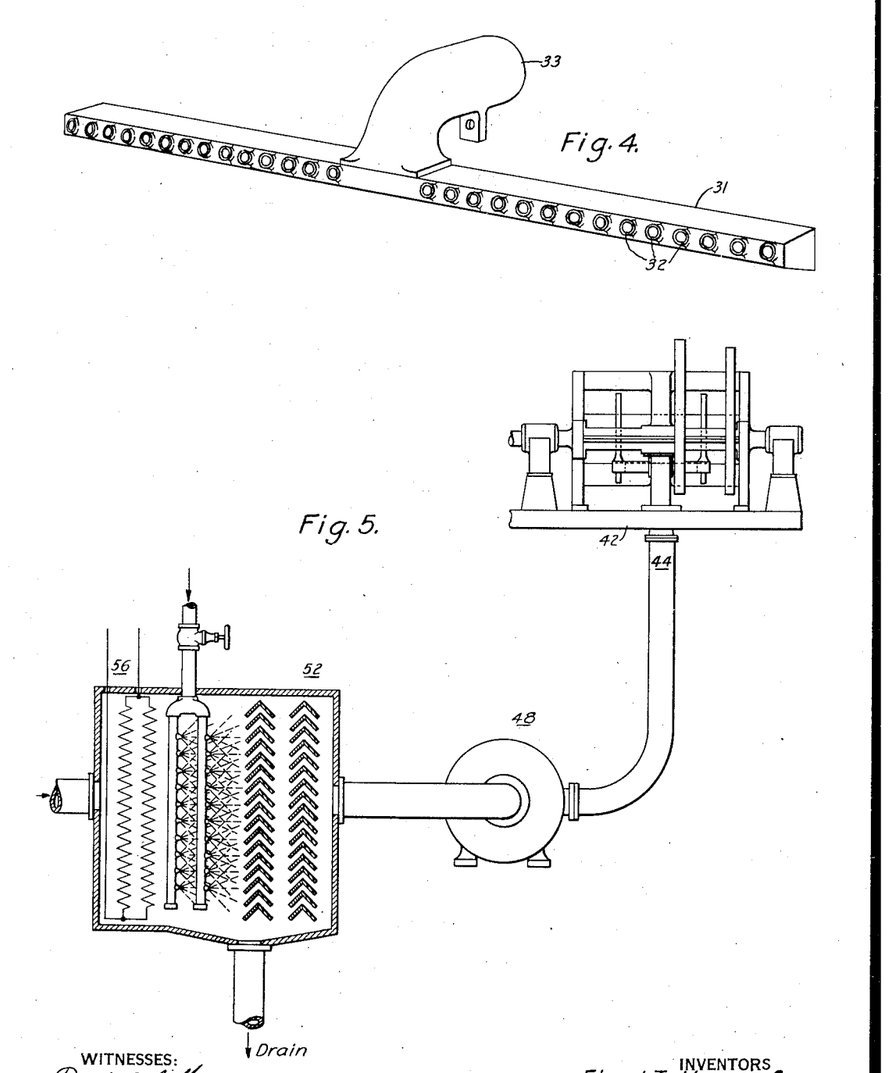
Fig. 4 is a perspective view of an air-distributor duct.
Fig. 5 is a diagrammatic view of the air-conditioning assembly.

As shown in Fig. 5, our high-pressure air system includes an air-blower 48, an air-washer 52 and a heater in the form of electric or steam-coils 56, the function of the latter being to insure that the air is supplied to the collector-cylinders at a temperature at least as high as about 40° F., below which the air cannot hold 3 grains of water per cubic foot, even when saturated. By the means just described, it is possible to maintain a controlled air-humidity, as will be observed from the following table showing the relationship between dry-bulb air-temperatures and wet-bulb air-temperatures necessary in order to maintain 3 grains of water for each cubic foot of air:

| Dry-bulb ° F. | Wet-bulb ° F. | Relative humidity | Grains of water/cu. ft. of air |
|---|---|---|---|
| 40 | 40 | 100 | 3 |
| 50 | 46 | 75 | 3 |
| 60 | 51 | 55 | 3 |
| 70 | 55 | 40 | 3 |
| 80 | 59 | 30 | 3 |
| 90 | 63 | 20 | 3 |
| 100 | 66 | 15 | 3 |

An incident in our experience in perfecting our present design of unipolar generator is illustrative of the extreme importance of a uniform air-distribution over the entire surface of the collectors, so that all of the brushes, operating in parallel on each collector, have exactly the same atmosphere in which to operate. At one stage in our development-work, we attempted to operate the machine with a blast of general ventilating-air, coming up from the bottom of the pit and striking the bottom halves of the collectors, so that the top and bottom halves of the collectors were not subjected to the same air-conditions. A thing developed, which was surprising to us, at that stage in our development, in that the upper half of the machine took 50% overload, whereas the lower brushes dropped to 50% load. When the unequal air-distribution was stopped, the brush-current distribution again became normal. This was tried several times, and thoroughly demonstrated the essential operating condition, which we believe to be novel with our machine, that a machine in which air is piped at high-pressure, and distributed over the full length of each brush-arm is immune to variations of room air, and is immune to bad current-distribution in the brushes due to unequal conditions of the contact films, provided that no unsymmetrical blast of air is directed against one side of the collectors, as we once did in our experiments with the air blown up from the pit underneath the generator. We believe that this extreme sensitivity of the brush contact-drops to the air-conditions surrounding the respective brushes which are connected in parallel, is an important and novel part of our invention or discovery, particularly in connection with our unipolar machine, wherein more than 50% of the collector surface is covered by brushes.

While we have described our invention in a preferred form of embodiment, it will be obvious that many changes in details and arrangements may be made by those skilled in the art without sacrificing many of the essential principles of our invention. We desire, therefore, that the appended claims shall be accorded the broadest construction consistent with their language and the prior art.

We claim as our invention:

1. Current-collection apparatus particularly adapted for heavy-duty unipolar generators of low voltage and high current-capacity, comprising a rotating, solid collector-cylinder having materially greater strength, hardness, and ability to maintain its hardness at elevated temperatures, than pure hard-drawn copper, coupled with thermal and electrical conductivities at least about 80% as good as pure copper, and a set of brushes bearing substantially radially thereon and covering more than 50% of the circumferential extent of the collector surface.

2. Current-collection apparatus comprising a rotor member having a solid collector-cylinder, said cylinder being of a material having materially greater strength, hardness, and ability to maintain its hardness at elevated temperatures, than pure hard-drawn copper, coupled with thermal and electrical conductivities at least about 80% as good as pure copper, and a set of brushes bearing substantially radially thereon.

3. Current-collection apparatus particularly adapted for heavy-duty unipolar generators of low voltage and high current-capacity, comprising a rotating, solid collector-cylinder of a copper-base alloy containing chromium in an amount from .1 to 1 percent, and a set of brushes bearing substantially radially thereon and covering more than 50% of the circumferential extent of the collector surface.

4. Current-collection apparatus comprising a rotor member having a solid collector-cylinder, said cylinder being of a copper-base alloy containing chromium in an amount from .1 to 1 percent, and a set of brushes bearing substantially radially thereon.

5. Current-collection apparatus particularly adapted for heavy-duty unipolar generators of low voltage and high current-capacity, comprising a rotating, solid collector-cylinder of a copper-base alloy containing chromium in an amount from .1 to 1 percent, and silver in an amount from 1 to 100 ounces per ton, and a set of brushes bearing substantially radially thereon and covering more than 50% of the circumferential extent of the collector surface.

6. Current-collection apparatus comprising a rotor member having a solid collector-cylinder, said cylinder being of a copper-base alloy containing chromium in an amount from .1 to 1 percent, and silver in an amount from 1 to 100 ounces per ton, and a set of brushes bearing substantially radially thereon.

7. Current-collection apparatus particularly adapted for heavy-duty unipolar generators of low voltage and high current-capacity, comprising a rotating, solid collector-cylinder of a copper-base alloy containing chromium in an amount up to about 2 percent, and a set of brushes bearing substantially radially thereon and covering more than 50% of the circumferential extent of the collector surface.

8. Current-collection apparatus comprising a rotor member having a solid collector-cylinder, said cylinder being of a copper-base alloy containing chromium in an amount up to about 2 percent, and a set of brushes bearing substantially radially thereon.

9. Current-collection apparatus particularly adapted for heavy-duty unipolar generators of low voltage and high current-capacity, comprising a rotating, solid collector-cylinder of a copper-base alloy containing chromium in an amount up to about 2 percent, and a small admixture of silver, and a set of brushes bearing substantially radially thereon and covering more than 50% of the circumferential extent of the collector surface.

10. Current-collection apparatus comprising a rotor member having a solid collector-cylinder, said cylinder being of a copper-base alloy containing chromium in an amount up to about 2 percent, and a small admixture of silver, and a set of brushes bearing substantially radially thereon.

11. Current-collection apparatus particularly adapted for heavy-duty unipolar generators of low voltage and high current-capacity, comprising a rotating, solid collector-cylinder of a hardness exceeding 75 Brinell and an electrical conductivity exceeding 70% of that of pure copper, and a set of brushes bearing substantially radially thereon and covering more than 50% of the circumferential extent of the collector surface.

12. Current-collection apparatus particularly adapted for heavy-duty unipolar generators of low voltage and high current-capacity, comprising a rotating, solid collector-cylinder of a hardness of at least about 100 Brinell and an electrical conductivity of at least about 80% of that of pure copper, and a set of brushes bearing substantially radially thereon and covering more than 50% of the circumferential extent of the collector surface.

13. Current-collection apparatus particularly adapted for heavy-duty unipolar generators of low voltage and high current-capacity, comprising a rotating, solid collector-cylinder of greater axial length than radius, said collector-cylinder having a hardness exceeding 75 Brinell and an electrical conductivity exceeding 70% of that of pure copper, and a set of brushes bearing substantially radially thereon and covering more than 50% of the circumferential extent of the collector surface.

14. Current-collection apparatus particularly adapted for heavy-duty unipolar generators of low voltage and high current-capacity, comprising a rotating, solid collector-cylinder of greater axial length than radius, said collector-cylinder having a hardness of at least about 100 Brinell and an electrical conductivity of at least about 80% of that of pure copper, and a set of brushes bearing substantially radially thereon and covering more than 50% of the circumferential extent of the collector surface.

15. Current-collection apparatus particularly adapted for heavy-duty unipolar generators of low voltage and high current-capacity, comprising a rotating, solid collector-cylinder of a hardness exceeding 75 Brinell and an electrical conductivity exceeding 70% of that of pure copper, a set of brushes bearing substantially radially thereon and covering more than 50% of the circumferential extent of the collector surface, and a fluid-supply system for directing, against portions of the collector surface not covered by brushes, an oxidizing fluid in a large number of jets, well distributed both axially and circumferentially of the collector-cylinder.

16. Current-collection apparatus particularly adapted for heavy-duty unipolar generators of low voltage and high current-capacity, comprising a rotating, solid collector-cylinder, a set of brushes bearing substantially radially thereon and covering more than 50% of the circumferential extent of the collector surface, and a fluid-supply system for directing, against portions of the collector surface not covered by brushes, an oxidizing fluid in a large number of jets, well distributed both axially and circumferentially of the collector-cylinder.

17. Current-collection apparatus particularly adapted for heavy-duty unipolar generators of low voltage and high current-capacity, comprising a rotating, solid collector-cylinder of a hardness exceeding 75 Brinell and an electrical conductivity exceeding 70% of that of pure copper, a set of brushes bearing substantially radially thereon and covering more than 50% of the circumferential extent of the collector surface, and a blower system for blowing, against portions of the collector surface not covered by brushes, a plurality of jets of similar gaseous composition, said jets being so well distributed, both axially and circumferentially of the collector-cylinder, and the other operating conditions being such, that substantially all of the brushes have substantially the same atmosphere in which to operate.

18. Current-collection apparatus particularly adapted for heavy-duty unipolar generators of low voltage and high current-capacity, comprising a rotating, solid collector-cylinder, a set of brushes bearing substantially radially thereon and covering more than 50% of the circumferential extent of the collector surface, and a blower system for blowing, against portions of the collector surface not covered by brushes, a plurality of jets of similar gaseous composition, said jets being so well distributed, both axially and circumferentially of the collector-cylinder, and the other operating conditions being such, that substantially all of the brushes have substantially the same atmosphere in which to operate.

19. Current-collecting apparatus comprising a rotating cylindrical current-collecting element, a plurality of brushes bearing substantially radially thereon, and a blower system for blowing, against the cylindrical surface of the current-collecting element, a plurality of jets of similar gaseous composition, said jets being so well distributed, both axially and circumferentially of said cylindrical surface, and the other operating conditions being such, that substantially all of the brushes have substantially the same atmosphere in which to operate.

20. Current-collection apparatus particularly adapted for heavy-duty unipolar generators of low voltage and high current-capacity, comprising a rotating, solid collector-cylinder of a hardness exceeding 75 Brinell and an electrical conductivity exceeding 70% of that of pure copper, a set of brushes bearing substantially radially thereon and covering more than 50% of the circumferential extent of the collector surface, air-blower means for supplying humidified air of humidity greater than 1.5 grains of water per cubic foot of air, and means for so applying said air to the collector surface that substantially all of the brushes have substantially the same humidified atmosphere in which to operate.

21. Current-collection apparatus particularly adapted for heavy-duty generators of low voltage and high current-capacity, comprising a rotating, solid collector-cylinder, a set of brushes bearing substantially radially thereon and covering more than 50% of the circumferential extent of the collector surface, air-blower means for supplying humidified air of humidity greater than 1.5 grains of water per cubic foot of air, and means for so applying said air to the collector surface that substantially all of the brushes have substantially the same humidified atmosphere in which to operate.

22. Current-collecting apparatus comprising a rotating cylindrical current-collecting element, a plurality of brushes bearing substantially radially thereon, air-blower means for supplying humidified air of humidity greater than 1.5 grains of water per cubic foot of air, and means for so applying said air to the cylindrical surface of the current-collecting element that substantially all of the brushes have substantially the same humidified atmosphere in which to operate.

23. Current-collection apparatus particularly adapted for heavy-duty unipolar generators of low voltage and high current-capacity, comprising a rotating, solid collector-cylinder of a hardness exceeding 75 Brinell and an electrical conductivity exceeding 70% of that of pure copper, a set of brushes bearing substantially radially thereon and covering more than 50% of the circumferential extent of the collector surface, air-blower means for supplying humidified air of humidity at least as much as about 3 grains of water per cubic foot of air, and means for so applying said air to the collector surface that substantially all of the brushes have substantially the same humidified atmosphere in which to operate.

24. Current-collection apparatus particularly adapted for heavy-duty unipolar generators of low voltage and high current-capacity, comprising a rotating, solid collector-cylinder, a set of brushes bearing substantially radially thereon and covering more than 50% of the circumferential extent of the collector surface, air-blower means for supplying humidified air of humidity at least as much as about 3 grains of water per cubic foot of air, and means for so applying said air to the collector surface that substantially all of the brushes have substantially the same humidified atmosphere in which to operate.

25. Current-collecting apparatus comprising a rotating cylindrical current-collecting element, a plurality of brushes bearing substantially radially thereon, air-blower means for supplying humidified air of humidity at least as much as about 3 grains of water per cubic foot of air, and means for so applying said air to the cylindrical surface of the current-collecting element that substantially all of the brushes have substantially the same humidified atmosphere in which to operate.

26. Current-collection apparatus particularly adapted for heavy-duty unipolar generators of low voltage and high current-capacity, comprising a rotating, solid collector-cylinder having one or more spiral grooves in its peripheral cylindrical surface, water-cooling means for cooling said collector-cylinder at points radially removed from said grooved peripheral cylindrical surface, a set of brushes bearing substantially radially thereon and covering more than 50% of the circumferential extent of the collector surface, and means for causing said brushes and collector-cylinder to operate in a controlled-humidity atmosphere containing more than 1.5 grains of water per cubic foot.

27. Current-collection apparatus particularly adapted for heavy-duty unipolar generators of low voltage and high current-capacity, comprising a rotating, solid collector-cylinder having one or more spiral grooves in its peripheral cylindrical surface, water-cooling means for cooling said collector-cylinder at points radially removed from said grooved peripheral cylindrical surface, a set of brushes bearing substantially radially thereon and covering more than 50% of the circumferential extent of the collector surface, and means for causing said brushes and collector-cylinder to operate in a controlled-humidity atmosphere containing at least as much as about 3 grains of water per cubic foot.

28. Current-collecting apparatus comprising a rotating cylindrical current-collecting element, a plurality of brushes bearing substantially radially thereon, and means for causing said brushes and cylindrical current-collecting element to operate in a controlled-humidity atmosphere containing more than 1.5 grains of water per cubic foot.

29. Current-collecting apparatus comprising a rotating cylindrical current-collecting element, a plurality of brushes bearing substantially radially thereon, and means for causing said brushes and cylindrical current-collecting element to operate in a controlled-humidity atmosphere containing at least as much as about 3 grains of water per cubic foot.

30. Current-collection apparatus particularly adapted for heavy-duty unipolar generators of low voltage and high current-capacity, comprising a rotating, solid collector-cylinder, a stator part having a plurality of axially extending arms spaced around the collector-cylinder, brushholders disposed between successive pairs of said arms and supported thereby, brushes so supported by said brushholders as to bear substantially radially on said collector-cylinder, axially extending air-distributor members mounted under the several axially extending arms and each having a plurality of nozzles directed toward the collector surface, and separable segmental air-ducts surrounding said axially extending arms and separably connected to said air-distributor members for supplying air thereto.

FLOYD T. HAGUE.
FREDERICK R. DAVIS.